United States Patent [19]

Nava

[11] Patent Number: 4,473,208
[45] Date of Patent: Sep. 25, 1984

[54] APPARATUS FOR MAKING HELMETS

[76] Inventor: Pier L. Nava, Via Carnovali 100/C, Bergamo, Italy

[21] Appl. No.: 381,489

[22] Filed: May 24, 1982

[51] Int. Cl.³ .......................... B29C 1/12; B29C 1/14
[52] U.S. Cl. ...................................... 249/65; 264/314
[58] Field of Search ............... 264/314, 229, 257, 258, 264/231, 258, 314; 249/65; 425/417, DIG. 44

[56] References Cited

U.S. PATENT DOCUMENTS

| | | | |
|---|---|---|---|
| 2,115,065 | 4/1938 | Dym | 2/412 |
| 2,123,275 | 7/1938 | Dym | 264/257 |
| 2,532,442 | 2/1950 | Daly | 2/412 |
| 2,746,049 | 5/1956 | Hudson | 2/412 |
| 3,320,619 | 5/1967 | Lastnik et al. | 2/6 |
| 3,444,288 | 5/1969 | Mead | 264/257 |
| 3,479,666 | 11/1969 | Webb | 2/6 |
| 3,561,079 | 2/1971 | Anderson | 425/417 |
| 3,674,394 | 7/1972 | Wiltshire | 425/417 |
| 4,008,949 | 2/1977 | Luna | 2/410 |
| 4,288,268 | 9/1981 | Hartnung | 2/410 |

FOREIGN PATENT DOCUMENTS 16945 10/1980 European Pat. Off. ............... 2/412

Primary Examiner—Willard E. Hoag
Attorney, Agent, or Firm—Ladas & Parry

[57] ABSTRACT

A mold for molding textile layers and resin to make helmets having a cavity mold member and a cooperating core member. The core member having an expansible elastic membrane thereabout and having a peripheral groove for securing reinforcing layers to the core.

3 Claims, 4 Drawing Figures

APPARATUS FOR MAKING HELMETS

DESCRIPTION

This invention relates to a process and relative device for producing hollow bodies in reinforced resin, for example, helmets and the like.

The end use requirements of reinforced resin hollow bodies are well known and, in the specific case of protective helmets—where this invention finds particular, but not exclusive application—said hollow bodies must have a structure apt to withstand shocks, even repeated, and must also be light in weight.

It has been endeavoured to meet the above requirements by providing hollow bodies in molded resin, reinforced with a suitable textile reinforcement. The structures of the hollow bodies thus obtained satisfy, however, only partly, the desired requirements and do not satisfy other important requirements, especially with regard to their resistance to repeated shocks. Briefly, the structure of said devices must be such that under repeated shocks, even if constantly localized in the same area, the structure may react resiliently without producing cracks or flaking that could damage the structure and which thereby ensures that the shock be distributed over a wider area. In the case of helmets in particular, the formation of cracks and breaks along the meridian planes of the structure must be avoided as these can prejudice the safety of the user.

This invention proposes to provide hollow bodies, shaped as headgear in particular, apt to be used as shock resistant protective helmets in which a suitable textile reinforcement is embedded in the bonding resin in a manner such as to form a resilient structure, the resistance of which is as uniform as possible.

A further scope of the invention is to provide a hollow body of the specified type, the internal and external surfaces of which are smooth and can thus constitute the finished surface which may easily be provided with designs and markings, also when the textile reinforcement or elements forming same are of yarn or single thread fibers, having a certain degree of rigidity, and which tend to project from said surface.

A further scope of the invention is to provide hollow bodies, the external surface of which requires practically no finishing work and which, in relation to end use requirements has the desired coloring and/or designs, to meet aesthetic requirements.

A further scope of the invention is to provide hollow bodies in resin having discontinuous shapes and undercuts and being such that parts of their surfaces form angles of less than 90° with respect to a vertical plane.

The process according to the invention, in which the hollow body is provided with a reinforcement formed by a plurality of woven fabric and/or netting layers, incorporated into a bonding resin, is characterized in that the textile reinforcement layers are applied one one of the two parts of a mold and in that at least part of the peripheral edges of said reinforcement are secured to said mold; in applying a controlled tension to the textile reinforcement and in maintaining it during the subsequent molding phase and, in particular, during solidification or polymerization of the bonding resin; in removing the hollow body obtained from the mold, so that the textile reinforcement is incorporated and held in the resin in a state of constraint.

The woven and/or net textile reinforcement according to the invention consists of a plurality of elements, performed in the shape of caps, at least part of which is obtained by weaving the central zone of said cap in the form of a spiral. Alternatively, the elementary caps are obtained from a woven tubular body, one of the ends of which is crown shaped, the edges of the cusps of said crown being joined by sewing or, in the case of materials having thermoplastic yarns, by welding, whilst the caps obtained are superimposed on each other, angularly shifting and in succession the joined areas to form a homogeneous layer of practically uniform thickness.

Depending on the end use and requirements for the hollow body, the weaving of the elementary caps may be effected in such way as to provide areas of different density or weave closeness which, during the molding of the body, are subjected to a controlled tension produced by a fluid under pressure.

The prior application of the controlled tension to the textile reinforcement can be effected with suitable criteria such as to be correlated to the physical characteristics of the threads or yarns forming the caps and/or the weave characteristics of said caps. For example, the tension applied to the textile reinforcement may be referred to and consider as a limit value the resilience module or tensile strength of the thread or yarn used in each case. Obviously, the tension previously applied to the textile reinforcement must be correlated to the temperatures of molding and treatment of the bonding resins used to obtain the hollow body under consideration.

Again with regard to the end use of the hollow bodies obtained, the textile reinforcement can be associated with lining layers, internal and/or external to the hollow body under consideration, which layers may consists of suitable resin films, for example, thermoplastic resin films, to be incorporated in the bonding resin or by thermo setting resins. In this latter case, it is possible to easily and quickly obtain hollow bodies, in particular helmets, the outer surface of which is smooth and requires practically no finishing operation. Moreover, said lining films may be shaped in advance as external and/or internal caps to determine the finished surfaces and the desired characteristics of said bodies. Thus, for example, an external cap of suitable material, for example, thermoplastic, makes it possible to obtain smooth even surfaces and avoids that joints or projections formed by the textile reinforcement threads may project from the surface of the hollow body. Furthermore, the lining film or cap may be provided with designs or figures which would be reproduced on the surface of the hollow body, especially when the bonding resin of the textile reinforcement is transparent, even to a limited degree.

The invention will now be explained by the following description which refers to the attached drawings which illustrate, by way of example, a preferred form of embodiment of the device for working the process according to the invention. Specifically:

Figure 1:
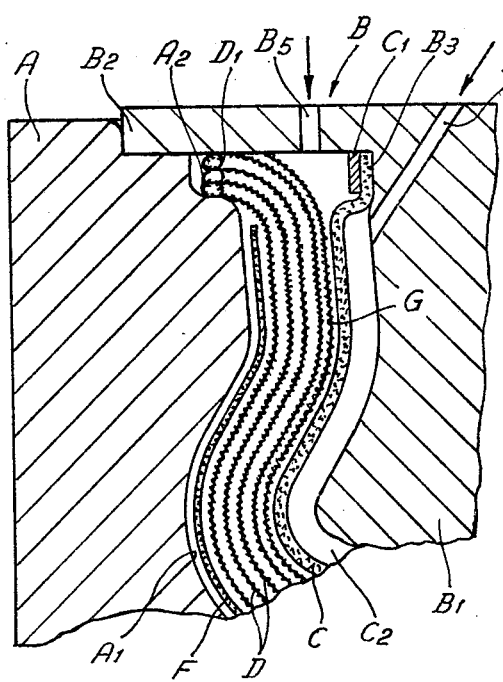
FIG. 1 is a partial schematic cross section of the mold which implements the process according to the invention.

The process according to the invention will now be explained in relation to FIGS. 1 and 2 of the attached drawings and to the construction of a protective helmet.

To obtain the helmet in question, it is necessary first to prepare the textile reinforcement formed by two or more overlapping woven layers having suitable yarns of synthetic materials (thermoplastic resins) and/or natural materials: vegetable (such as linen, cotton or the like) or mineral (such as asbestos, glass, etc.). Advantageously there are used woven and/or net textiles, prepared at least in part with threads or filaments of thermoplastic resins, such as vinyl, polystyrene, acrylic, polyamide, polyurethane resins, etc., in particular, filaments of aramidic resins known as "KEVLAR" are used.

The textile reinforcement according to the invention is formed by a plurality of superimposed layers, which may vary both as to the composition of the threads or filaments used and as to the number of threads in each layer. Furthermore, the weave density or closeness may also vary. Each layer of the textile reinforcement consists of a woven cap which is spirally wound up to a given diameter, beyond which the weave continues helically, that is, the number of stitches for each turn of the cap under formation is kept practically constant. Alternatively, the cap is obtained by starting from a tubular woven textile of suitable diameter. To obtain elements of the desired length, one of the ends of each is sewn in the shape of a crown. The cusps or points of each crown are then bent inwardly so as to position the peaks of the cusps on the axis of the tubular textile. Lastly, the edges or borders of the cusps are joined to each other by stitching, or, in the case of synthetic threads, also by welding, to thus form the caps.

A certain number of caps thus prepared (in practice the number may vary from two upwards) are superimposed to form a textile reinforcement of the desired characteristics.

When the bottom of the caps consists of cusps welded during the overlapping phase of caps D, the meridian joining ribs are angularly displaced with respect to each other in such way that the thickness and the structure of the textile reinforcement obtained is homogeneous and practically uniform.

Edges D1 of caps D may be enlarged to ensure their anchorage during the subsequent tensioning so that during this operation the different textile layers may freely slip over one another to become tensioned.

The woven caps D thus prepared, and before the molding operation, may be subjected to preliminary treatment, for example, imbibition with suitable materials, preshaping and so on, in order to meet the particular requirements of the finished product produced in each case.

Again with reference to FIGS. 1 and 2 of the drawings, these illustrate two forms of embodiment of the mold by means of which the process according to the invention is worked which, in the specific case, provides a protective helmet, similar to that considered in another patent by the same author.

The mold illustrated consists of a female die A and a male die B provided with a shaped body B1 forming said male die which is secured to a supporting plate B2 and housed as described herein in shaped cavity A1 of said female die, which reproduces, in the negative, the shape of the helmet.

The two parts A and B of the mold are secured to each other in the known manner to the stationary and movable planes of a press to block them to each other in accordance with the following.

According to the present invention, shaped body B1 retains elastic lining C constituting a shaped bladded closed by collar C1 to groove B3 provided at the upper part of said shaped body. There is thus obtained between these parts, sealed gap C2 connected by means of conduits B4 with a suitable pressurized fluid source, to dilate and deform bladder C; preferably oil or compressed air is introduced into gap C2 at a suitable pressure, for example at 20 atm.

In FIG. 1, the peripheral edge of shaped cavity A1 of female die A is provided with shoulder A2, the bottom of which is inclined and converges downward. The shoulder is closed by plate B2 of male die B to form a blocking member for textile reinforcement D, as disclosed hereinafter.

Again in relation to the working of the process according to the present invention, the plurality of superimposed caps D forming the textile reinforcement is introduced into cavity A1 of female die A of FIG. 1. In the case illustrated, textile reinforcement D is prearranged between external cap F and internal cap G having characteristics suitable for the purpose to be achieved and which will be disclosed hereafter. External cap F, which is close to or in contact with the wall of cavity A1, is made of suitable material, for example of textile woven with cotton or similar yarn, to form an external layer or coating of suitble consistency apt to prevent that points or the like of caps D of synthetic material project from the helmet surface after molding. Cap F may advantageously consist of a lamina or film of thermoplastic resin, for example, polyethylene, PVC or similar materials, so that during the subsequent molding phase it is incorporated into the bonding resin to form a smooth and well finished outer surface having the desired characteristics. It is possible, in particular, to produce helmets having the desired aesthetical features since cap F can be colored, as desired, and have designs applied to it in advance, whether the caps be textile or of thermoplastic materials. In both cases, cap F is secured and incorporated in the bonding resin during the molding phase. Similar results are achieved with internal cap G which, however, is also provided as a protective element for elastic bladder C and for other parts of the mold.

Again with reference to FIG. 1 of the drawing, after having placed the set of superimposed caps D,F,G in female die A, the enlarged edges D1 of textile caps D are folded outwardly and are partly housed within shoulder A2 of said female die, the depth of which is less than the thickness formed by said edges D1. External cap F can be devised in such way that its edge F1 is disengaged from shoulder A2 of the mold so that during molding, said cap adheres to shaped cavity A1 of the mold. A similar result can be obtained by providing cap F which is conveniently sized and is such as to adhere continuously to cavity A1, even when the edge of said cap is fixed on the bottom of shoulder A2 thus permitting that adequate tension is always imparted to textile reinforcement D during the molding phase.

Male element B1 is then introduced in the aperture of textile reinforcement D and caps F and G, previously housed in cavity A1; this operation is easily performed since elastic bladder C adheres to the shaped surface of said male element. Coupling of the two parts A and B of the mold engages plate B2 with edges D1 of caps D which are thus pressed and tightened on the bottom of the peripheral shoulder.

Subsequently, a pressurized fluid is introduced into gap C2, for example oil at a pressure of 10-30 atm., which deforms elastic bladder C and imparts a tension to textile reinforcement D. This operation is performed in a suitable manner and is such as to apply the pressure gradually to the different textile layers of caps D to cause these to adhere completely to the shape of the walls of cavity A1. In particular, the amount of pressure in gap C2 is determined also with regard to the textile structure used, both as to the different caps D and to the different zones of each of said caps of textile reinforcement D, as shown in FIGS. 3 and 4.

In particular, the amount of pressure, and hence the tension applied to caps D of the textile reinforcement of the helmet, is correlated to the physical characteristics of the threads forming said textile reinforcement and to the purposes and end use requirements of the hollow bodies obtained in each case. In the specific case of helmets, a high resistance to shocks is required to avoid the formation of cracks or delamination of the layers forming the helmet structure.

Generally, the tensioning of textile reinforcement D is performed in such way as not to exceed the tensile strength of the yarn forming reinforcement D and, in the case of helmets in particular, the resilience module of the yarn of the textile reinforcement must not be exceeded.

Figure 3:
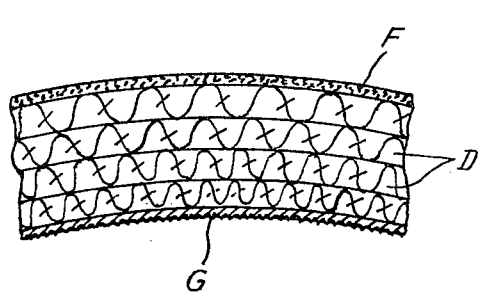
FIGS. 3 and 4 show on an enlarged scale and in a conventional manner, the fragmentary sections of two hollow bodies obtained in accordance with the invention.
Figure 4:
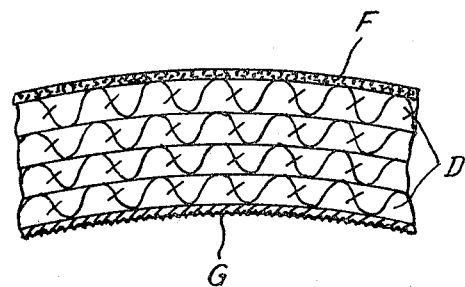

Obviously, and with reference to FIGS. 3 and 4 of the drawings, the tension applied to textile reinforcement D may vary from zone to zone of said reinforcement.

In this case, elastic bladder C is provided with zones of different elasticity, for example of different thickness, to impart thereby a lesser or greater tension to the zone of said textile reinforcement under consideration. In cases where the hollow body has projecting or shaped parts, male die B may make use of the teachings of another patent of same author, to reproduce the required profiles in said body.

After tensioning reinforcement D, a suitable resin is introduced into cavity A1 of the mold through conduit B4 located in a suitable position in male die B, for example a thermosetting bonding resin of epoxy or polyester. The bonding resin can be introduced beforehand into cavity A1 of the mold, after having inserted cap F into said cavity, especially when cap F is made of synthetic themoplastic material, to form the external surface of the hollow body. The bonding resin injected into cavity A1 imbibes textile reinforcement D and when the assembly is subjected to pressure by elastic bladder C, it takes on the form of said cavity A1.

When the bonding resin has polymerized and solidified, the pressure is discharged from bladder C, the mold is opened and the helmet is removed from female die A; textile reinforcement D of the helmet is embedded and fixed in the bonding resin and is maintained in a constant state of tension. The outer surface of the hollow body thus obtained is smooth and requires practically no finishing, also considering that said surface is colored as required, since, as already stated, external cap F can be colored and/or provided with designs or the like.

The hollow body, and in particular the helmet, obtained is complete in all respects in that its external surface is free from projections or sharp points, even when the textile forming reinforcement D consists of threads or filaments having a limited flexibility, as in the case of synthetic resins.

Figure 2:
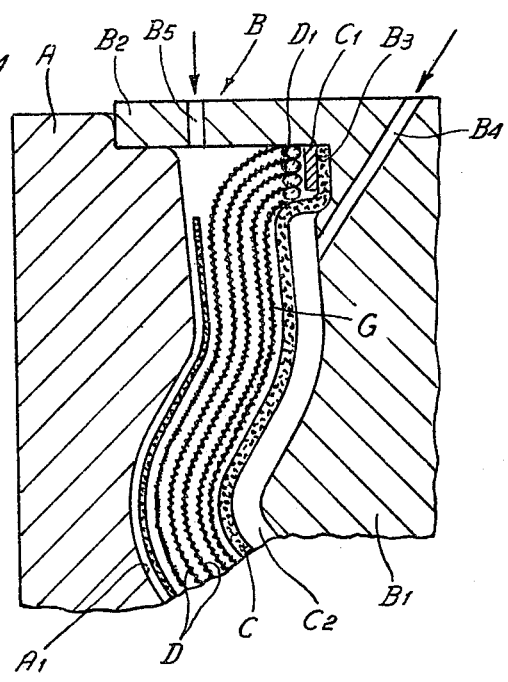
FIG. 2 is a similar cross section of a variant of the mold.

Following what stated with regard to the mold of FIG. 1, the same considerations apply to the mold of FIG. 2, also with regard to implementation of the process. In this case, enlarged edges D1 of reinforced caps D are housed in peripheral groove B3 of shaped body B1 which also holds securing collar C1. The securing of caps D to male die B of the mold facilitates production of the hollow body since the assembly formed by caps D and F-G can be anchored, as required, to said male die and the entire assembly is always easily engagable in cavity A.

Based on the above, the scope of the present invention is confirmed, that is, to obtain hollow bodies, resistent to mechanical stresses, in particular shock stresses, in such way that the walls of said bodies resiliently react to said stresses due to the presence of the textile reinforcement, which is in a state of permanent constraint.

With regard to the tensioning operation of textile reinforcement D, this operation can be performed in a manner such as to deform the woven or net textile in a direction substantially parallel to radial or substantially radial planes of the hollow body obtained. The tension can be applied to the layers constituting textile reinforcement D in such way that starting from the internal layers, the tension varies gradually towards the outer layers, for example, by varying the closeness of the weave and/or the title of the yarn forming the different caps of the reinforcement, as well as the dimensions of said caps. It is obvious that the same criterion can be applied in case it is desired to apply a substantially uniform and constant tension to the different layers of textile reinforcement D.

Although the present invention has been described with reference to particular embodiments and examples, it will be apparent to those skilled in the art that variations and modifications can be substitued therefor without departing from the principles and true spirit of the invention.

I claim:

1. An apparatus for manufacturing reinforced resin products comprising a mold including a unitary male mold member having engagable with a female mold member means for securing of at least a portion of said product inside of the mold and an elastically deformable member attached to said male mold member in such a manner that a pressurized fluid can be injected between said male mold member and said deformable member said male mold member having a peripheral groove adjacent at least said engagable means for attachment of at least a portion of the reinforcement of the product and the end of the elastically deformable member.

2. Apparatus according to claim 1 wherein a peripheral shoulder and corresponding projecting part are provided in an area of engagement between the male and female portion of the mold for securing of at least a portion of the reinforcement of said product during the manufacturing of said product.

3. Apparatus according to claim 1 wherein said means engageable with said female mold is a flange integral with said male mold member.

* * * * *